United States Patent

[11] 3,623,565

| [72] | Inventors | Eugene T. Ward<br>Highland Heights;<br>Richard Sklar, Cleveland Heights; Harvey H. Pierman, Chardon, all of Ohio |
|---|---|---|
| [21] | Appl. No. | 847,119 |
| [22] | Filed | Aug. 4, 1969 |
| [45] | Patented | Nov. 30, 1971 |
| [73] | Assignee | Action-Age, Inc.<br>Warrensville Heights, Ohio |

[54] RECREATIONAL VEHICLE
14 Claims, 11 Drawing Figs.

[52] U.S. Cl. .................................................. 180/6.2,
64/28 R, 180/54 A, 180/76, 180/89, 192/18 A
[51] Int. Cl. ...................................................... B62d 11/08
[50] Field of Search ......................................... 180/6.2,
6.7, 76; 192/18 A; 64/27 R, 27 C, 28 R; 115/1

[56] References Cited

UNITED STATES PATENTS

| 2,712,370 | 7/1955 | Westfall | 180/6.2 X |
| 3,059,397 | 10/1962 | Anderson et al. | 180/76 X |
| 3,182,528 | 5/1965 | Lamburn | 192/18 A X |
| 3,268,040 | 8/1966 | Dreeben | 192/18 A |
| 3,374,846 | 3/1968 | Massone | 180/6.7 |
| 3,444,837 | 9/1967 | Donofrio | 115/1 |
| 3,494,449 | 2/1970 | Umeda et al. | 180/6.2 |

FOREIGN PATENTS

| 1,014,762 | 6/1952 | France | 180/6.2 |
| 1,143,816 | 4/1957 | France | 180/6.2 |
| 725,686 | 3/1955 | Great Britain | 180/6.7 |
| 1,206,321 | 12/1965 | Germany | 180/6.7 |

Primary Examiner—Benjamin Hersh
Assistant Examiner—Leslie J. Paperner
Attorney—Watson, Leavenworth & Kelton ABSTRACT: An all-terrain recreational vehicle as disclosed which is capable of operating on water, on very soft terrain and on rough terrain. Three low-pressure tires are journaled on each side of a watertight fiber-reinforced plastic body. All wheels are driven by a rear mounted engine and steering is accomplished by declutching and braking the wheels on one side or the other of the vehicle. The wheels are journaled directly on the plastic body without separate framing making it possible to have a low operating center of gravity. Overload slip clutches at each wheel prevent excessive strain from being applied to the suspension system or the power-transmission system. A belly pan formed of tough abrasion resistant plastic is mounted on the underside of the vehicle body for impact and abrasion resistance. The transmission system includes parallel chain drives extending along each side of the vehicle, each driven by the engine through a separate clutch and brake mechanism. The clutch and brake mechanisms are selectively operated for steering by hydraulic pressure developed in response to steering wheel movement and are operated simultaneously by a hydraulic-brake system for braking. The engine is mounted on a floating frame to minimize noise and vibration transmission and to provide tensioning of the primary drive chains. The throttle system is arranged for direct actuation in combination with a governor which acts only to prevent overspeeding.

PATENTED NOV 30 1971

INVENTORS
EUGENE T. WARD,
RICHARD SKLAR,
& HARVEY H. PIERMAN
BY
McNENNY, FARRINGTON, PEARNE & GORDON
ATTORNEYS

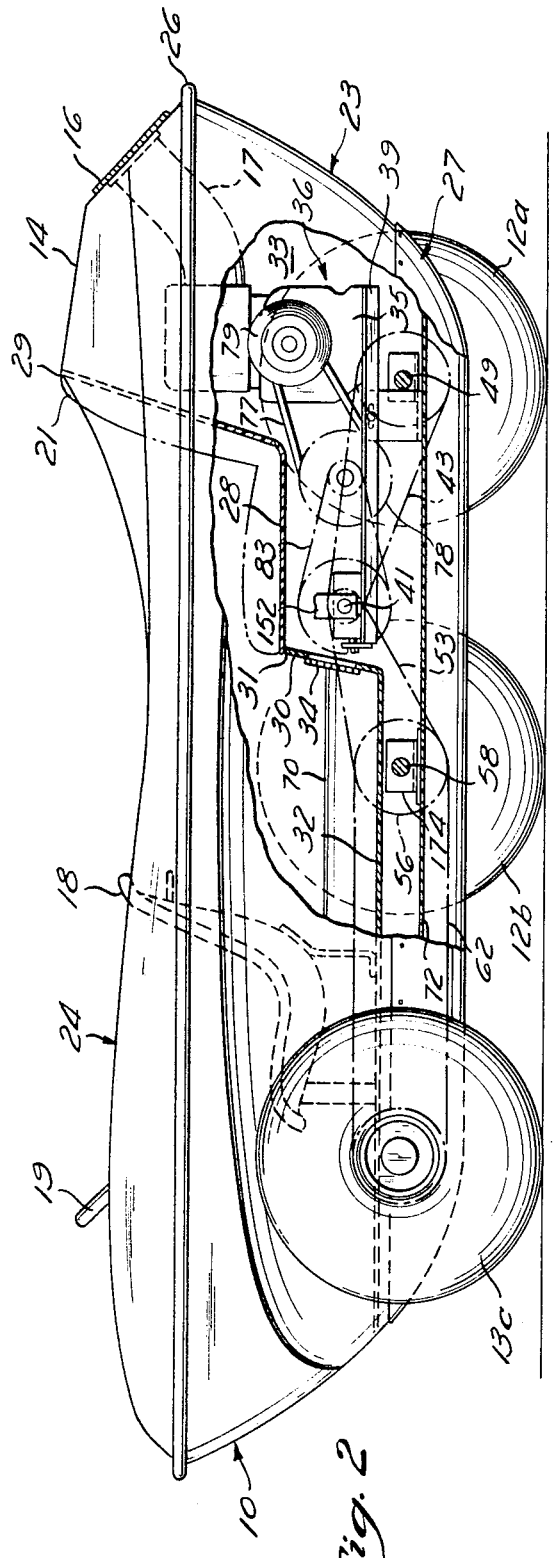
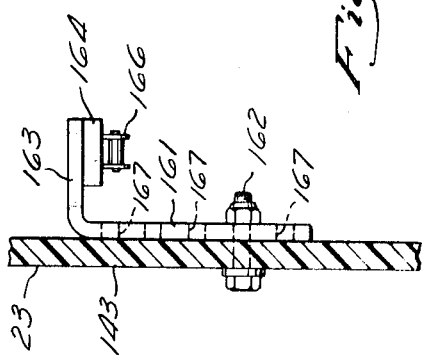
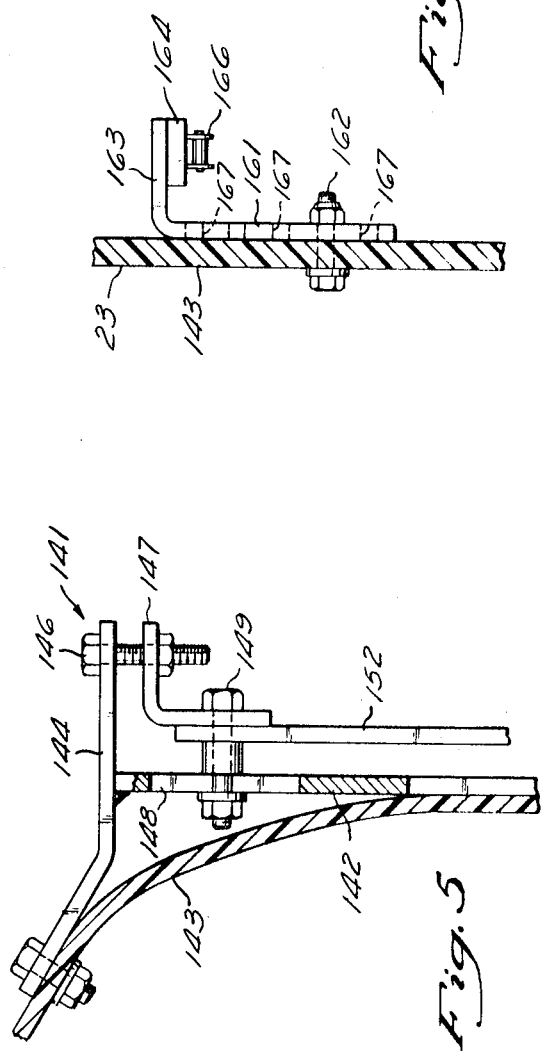

INVENTORS
EUGENE T. WARD,
RICHARD SKLAR,
& HARVEY H. PIERMAN
BY McNENNY, FARRINGTON, PEARNE & GORDON

ATTORNEYS

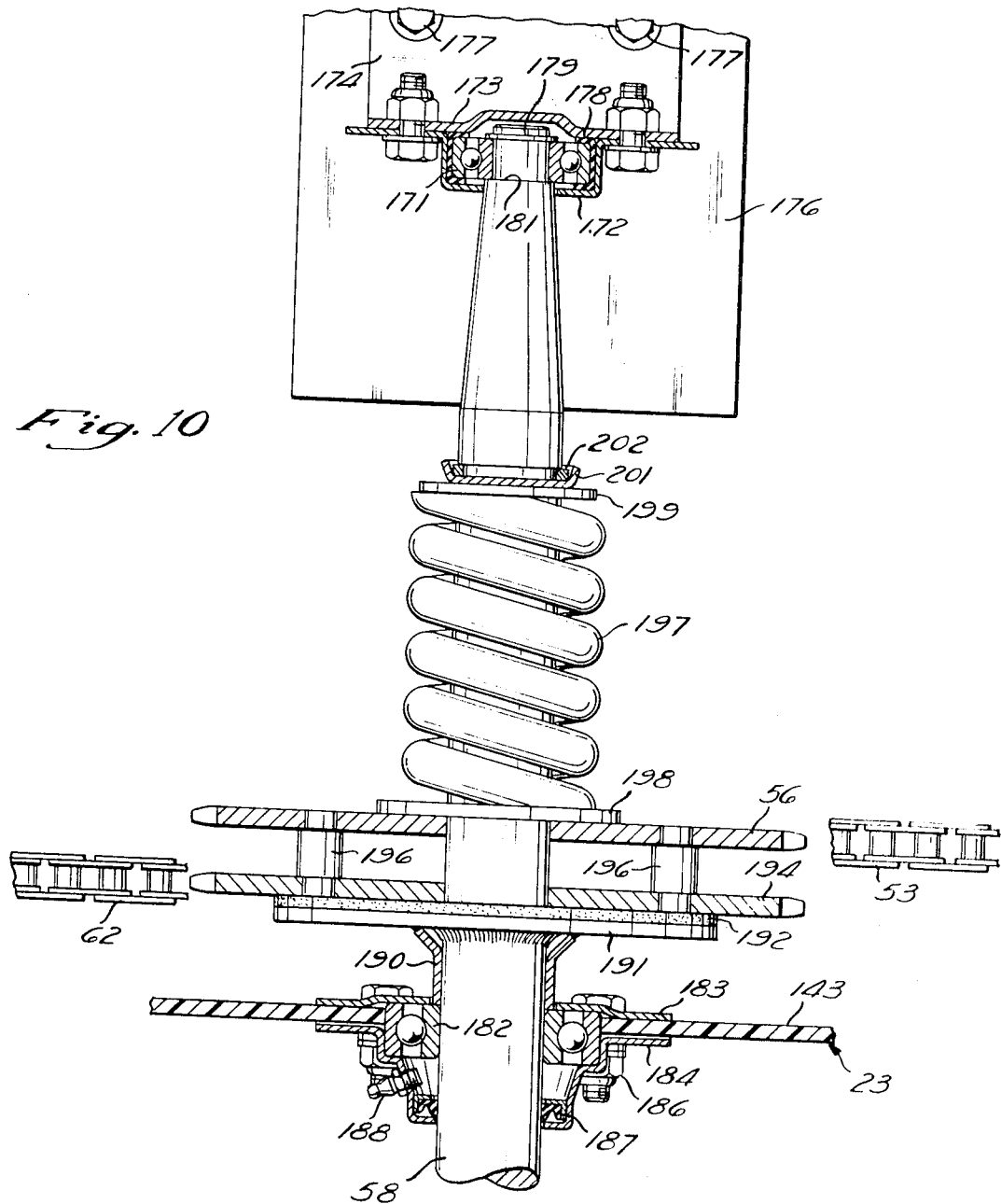

RECREATIONAL VEHICLE

BACKGROUND OF INVENTION

This invention relates generally to all-terrain vehicles and more particularly to a novel and improved all-terrain vehicle constructed and arranged so that it is light weight, durable, and relatively inexpensive.

PRIOR ART

One type of all-terrain vehicle includes a body provided with three low-pressure nonsteerable drive wheels journaled on each side of the vehicle body. In such vehicle straight ahead movement is provided by driving all of the wheels at substantially the same speed. Steering is accomplished by driving the wheels on the one side of the vehicle while the wheels on the other side of the vehicle, in the direction of turn, are declutched and usually braked. The radius of the turn is controlled by the amount of breaking applied to the wheels on the side of the vehicle in the direction of turn and, if sufficient braking is applied to lock such wheels against any appreciable rotation, the vehicle can be caused to pivot substantially about the center wheel of the group being locked.

Such vehicles are usually provided with a body which is watertight so that the vehicle can be operated in water. In such operations the buoyancy of the body itself and of the wheels provides the required floatation. Usually the tires are provided with peripherally spaced lateral ribs which function in the manner of a water wheel to propel the vehicle in water. These ribs also provide traction for land operation.

The tires used on such vehicles are very low-pressure tires having an inflated pressure in the order of 1½ pounds per square inch. Since the tires are very low-pressure tires, and since all of the wheels are driven, such vehicles can operate on substantially any type of terrain.

When such vehicles are operated on rough terrain, it is possible for all of the wheels to momentarily lose contact with the ground. When this occurs, there is tendency for the drive system to accelerate quickly to a speed substantially greater than the vehicle speed with respect to the ground. When the wheels reengage the ground a substantial strain is placed on the drive and suspension system since the wheels are almost instantaneously slowed to the rate of rotation corresponding to vehicle movement and the entire inertia of the drive system operating at high speed must be absorbed very quickly. A similar situation can occur when the vehicle is operated in the water and reaches shore. Water operation requires that the wheels rotate at a velocity which is considerably greater than the corresponding vehicle velocity. Consequently, the wheels first touch the shore, the contacting wheels are immediately slowed to the speed corresponding to the vehicle speed. This again causes the drive and suspension systems of the vehicle to be subjected to excessive strain. In the past it has been found that the drive system is often damaged by strains of the type described and breakage of the axles and drive system have been relatively common. In order to overcome this difficulty, the practice has been to employ heavy drive and suspension systems which are capable of absorbing substantial strain without failure. Such heavy drive ans suspension systems, however, increase cost, increase weight, and are often very complicated.

SUMMARY OF INVENTION

An all-terrain vehicle incorporating this invention is constructed for durability, light overall weight and relatively low cost. Various features of this invention cooperate and coact to permit the use of a relatively simple lightweight vehicle suspension and a relatively simple lightweight power-transmission system which function reliably under all types of normal use. There are a number of important aspects of this invention which coact and cooperate to achieve these results.

In accordance with one aspect of this invention a frameless molded plastic body is utilized. The power-transmission and suspension systems are mounted and arranged so that excessive loads are not applied to the vehicle body. Consequently, the use of heavy framing can be eliminated without sacrificing durability. The illustrated embodiment includes a body formed of a fiber-reinforced molded plastic, such as fiberglass. Such plastic provides a tough, strong structure capable of absorbing the loads encountered in normal vehicle operation.

Fiber-reinforced plastics, even though they are strong and provide substantial impact resistence, tend to be damaged by abrasion. Therefore, in the preferred embodiment of the invention a belly pan of polyethylene plastic or the like is secured to the underside of the body to protect the main body structure from abrasion damage, and to improve the toughness of the vehicle.

Because the vehicle does not require the use of a rigid frame, the transmission system can be low and the passengers can be located as low as possible in the vehicle. This improves stability since it results in a lower operating center of gravity.

In accordance with another important aspect of this invention, means are provided in the drive system of the vehicle to prevent excessive loads from being applied to the system. In the illustrated embodiment a separate overload clutch is provided at each wheel to limit the torque transmitted between the power-transmission system and the wheel to a value which does not cause excessive strain either on the suspension system or the power-transmission system. These clutches not only permit the use of a lighter transmission system but also permit the elimination of heavy framing members within the vehicle body.

In accordance with another aspect of this invention a simple chain drive, having a low profile and improved chain tensioning mechanisms is provided. In this system the use of the usual chain tensioning structures are eliminated to a great extend and the mounting of the engine and power unit is simplified. In the illustrated embodiment the main power unit is supported by a structure which minimizes the noise and vibration transmission to the vehicle body.

In accordance with still another aspect of this invention, a novel and improved steering and braking system is utilized. This system employs a simple hydraulic-steering unit which functions to selectively declutch the wheels in one or the other side of the vehicle and to then supply braking to such wheels for simple, but effective, steering. Further the same assembly provides hydraulic braking which functions to brake all of the wheels when full braking is required. Further, the brake system is arranged to prevent excessive strain from being applied to the transmission system by preventing the engine drive system from reaching a high velocity before the drive is engaged. In accordance with still another aspect of this invention an improved system for ventilating the engine compartment is provided. The engine cooling fan blows cooling air from the engine compartment over the engine and then out of the compartment. Therefore, the cooling fan causes a continuous flow of ventilating air through the engine compartment.

In accordance with still another aspect of this invention an improved throttle and governor system is provided wherein rapid accelerator response is achieved even though the engine is provided with a governor to protect the engine against overspeeding.

BRIEF DESCRIPTION OF DRAWINGS

FIG. 2 is a side elevation partially in section illustrating the general configuration of the vehicle;

FIG. 5 is an enlarged fragmentary view of the structure utilized to adjust the tension in the primary drive chains;

FIG. 6 is an enlarged fragmentary view of the tensioning mechanism for the front drive chain;

FIG. 10 is an enlarged fragmentary section illustrating the axle mounting structure and the overload clutch of one of the wheels.

FIG. 1 illustrates the general configuration of an all-terrain vehicle in accordance with this invention. This vehicle includes a body assembly 10 having an open passenger compartment 11. Three low-pressure nonsteerable drive wheels 12a, 12b and 12c are mounted on one side of the body 10 and a similar group of low-pressure nonsteerable drive wheels 13a through 13c are mounted on the opposite side of the vehicle. A power unit, which in the illustrated embodiment is driven by a four cycle gasoline engine, is mounted under the rearward deck 14 and is connected to drive all of the drive wheels in a manner described in detail below. In the illustrated embodiment a grille 16 is mounted in the rearward deck 14 to permit ventilation of the engine compartment and the cooling air for the engine is exhausted through a duct 17 to a position adjacent to the grille 16.

Figure 1:
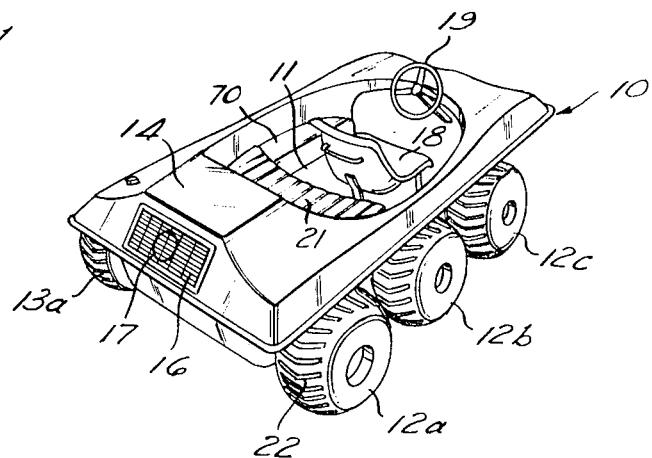
FIG. 1 is a perspective view of an all-terrain vehicle incorporating this invention.

In the illustrated embodiment, a bucket-type drivers seat 18 is centrally positioned in the passenger compartment 11 adjacent to the forward end thereof. A steering wheel 19 is conveniently located for the driver along the center line of the vehicle. The central positioning of the drivers seat 18 and steering wheel 19 is desirable since such a location provides the driver with equal visibility on both sides of the vehicle. A bench-type passenger seat extends across the passenger compartment behind the drivers seat 18. With this seating configuration a driver and two passengers can comfortably ride in the vehicle. It should be understood, however, that other types of seating configurations could be utilized if desired.

The tires 12 and 13 are preferably provided with peripherally spaced lateral ribs 22 which operate not only to provide traction in soft terrain, but also operate to propel the vehicle through water.

THE BODY STRUCTURE

Figure 3:
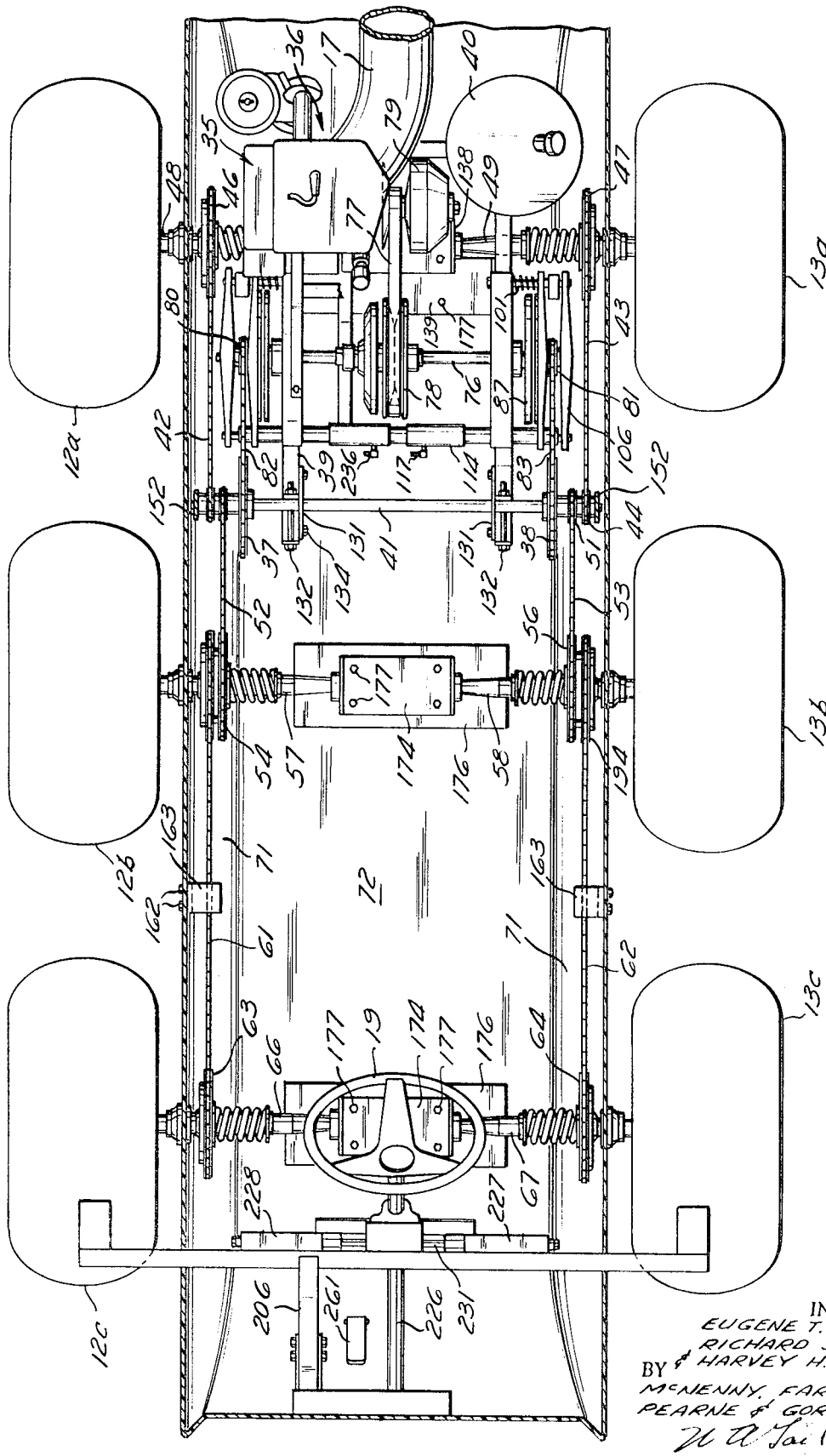
FIG. 3 is a plan view, with parts broken away for purposes of illustration, showing the general arrangement of the drive and suspension systems.
Figure 4:
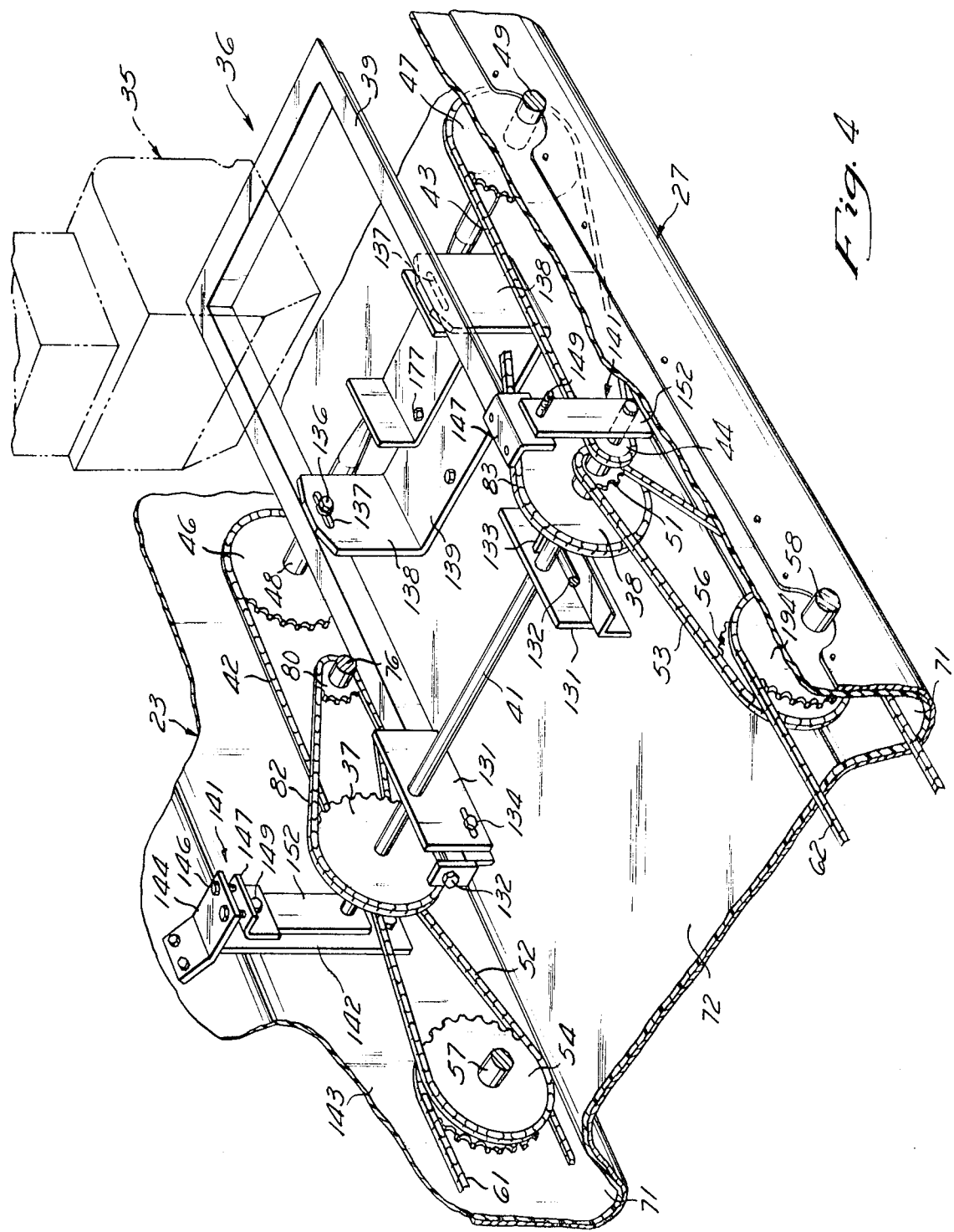
FIG. 4 is a fragmentary perspective view with parts removed for purposes of illustration showing the structure for supporting the main power unit.

Referring now to FIGS. 2 through 4, the principal body structure 10 consists of three separate molded plastic parts. The main body part is the lower body element 23 which is preferably formed of fiber-reinforced plastic, commonly referred to as fiber glass. Connected to the lower body element 23 is a separate molded fiber glass deck element 24. The two elements 23 and 24 are connected at 26 by bolts and a trim strip to form a unitary assembly. A belly pan 27 is riveted to the main body part 23. Preferably the belly pan 27 is formed of a molded plastic material which has high impact and abrasion resistence, such as polyethylene. The belly pan is molded to fit the lower portion of the main body part 23 so that it improves the structural strength of the body assembly along the lower side of the vehicle. In addition, it provides a protective cover over the lower portion of the fiber glass to prevent damage to the fiber glass caused by impacts and abrasion or the like. It has been found that if a belly pan is not provided the abrasion of the fiber glass caused when the vehicle is operated can damage the fiber glass and in some instances, cause a leak. However, with the belly pan formed of polyethylene or the like, this difficulty is virtually eliminated. In the event that the belly pan is damaged during the use of the vehicle, it can be removed and a new belly pan substituted therefor. In this way the extended life of the vehicle can be achieved without difficulty since a repair of the vehicle body can be accomplished with relative ease.

The rear seat 21 is preferably mounted on a single piece of molded plastic 28 which extends from an upper end at 29 to a lower end at 31. At its forward end it fits over an upstanding wall 30 at the rearward end of a floor member 32 which is also preferably formed of molded plastic such as fiber glass. The molded piece 28 cooperates with the rearward deck 14 to enclose the engine compartment 33 of the vehicle. Preferably, a grille is provided at 34 which opens to the engine compartment for ventilating purposes. The molded piece 28 which supports the rearward seat 21 is arranged to be easily removable to provide access to the engine compartment. Similarly, the floor piece 32 is also shaped to permit easy removal after the rearward part 28 has been removed to provide access to the forward portion of the drive system. The drivers seat 18 is preferably mounted on the floor piece 32 so that it is removed with the floor member when service is required. With this arrangement, access to the entire drive system can be easily obtained by the removal of two molded pieces 28 and 32. However, when they are in place, the drive system is completely enclosed.

THE DRIVE SYSTEM

The drive system includes a main power assembly 36 which includes a gasoline engine 35 and a transmission system connected to power two separate output sprockets 37 and 38, best illustrated in FIG. 4. A gas tank 40 for the engine 35 is mounted adjacent to the engine. The structure of the power assembly is discussed in detail below. The power assembly 36 is mounted on a floating frame 39 which is arranged to provide a minimum of noise and vibration transmission to the vehicle body. Each of the output sprockets 37 and 38 is journaled on a support shaft 41 and is connected to drive the wheels on the adjacent side of the vehicle.

The rearward wheels 12a and 13a are driven through rearwardly extending chains 42 and 43, respectively. The sprocket 38 is directly connected to and rotates a drive sprocket 44 powering the chains 43, (as illustrated in FIG. 4) and a similar drive sprocket is provided to drive the chain 42. The rearward ends of the chains 42 and 43 extend over driven sprockets 46 and 47, respectively, which are connected by a clutch (described in detail below) to the axles 48 and 49 for the rearward wheels 12a and 13a. A second drive sprocket 51 is associated with each of the output sprockets 37 and 38 and is connected through an intermediate forwardly extending chain 52 and 53 to drive a double sprocket 54 and 56, respectively. The double sprocket 54 and 56 are connected through a clutch mechanism to the axles 57 and 58 of the middle wheels 12b and 13b, respectively. The power for the forward wheels is provided by drive chains 61 and 62 which extend from the double sprockets 54 and 56 to driven sprockets 63 and 64 (illustrated in FIG. 3) which, in turn, drive the axles 66 and 67 for the forward wheels 12c and 13c, respectively.

The main body molding 23 is preferably formed with a downwardly extending lengthwise channel 71 (best illustrated in FIG. 4) along each side to accommodate the chains and the drive sprockets associated with the various axles. This channel structure which extends below the main bottom or floor 72 of the vehicle provides additional stiffening of the vehicle body structure as well as providing space to accommodate portions of the drive systems without raising the center of gravity of the vehicle.

The floor piece 32 is formed with raised sides at 70 (illustrated in FIG. 1) which cooperate with the channels 71 to provide a tunnel structure enclosing the forward portions of the drive system.

The various drive sprockets are proportioned so that all of the wheels 12 and 13 are driven at the same velocity when the two output sprockets 37 and 38 are driven at the same speed. When turning of the vehicle is required for steering purposes, one or the other of the output sprockets 37 or 38 is driven at engine speed while the other sprocket is declutched to disconnect it from the engine. If sharp turning is required, braking is then applied to the selective output sprocket so that the wheels of one side of the vehicle or the other side are held against rotation. The radius of the turn is controlled by the amount of braking and pivotal movement about either the wheels 12b or 13b can be established by holding the wheels on the one side or the other side of the vehicle against rotation.

It should be understood that belts could be substituted for the chains if desired. Generally, chains are preferred since they provide a positive drive. As used in the claims the term "belt" is intended to include chains of the type illustrated.

Figure 7:
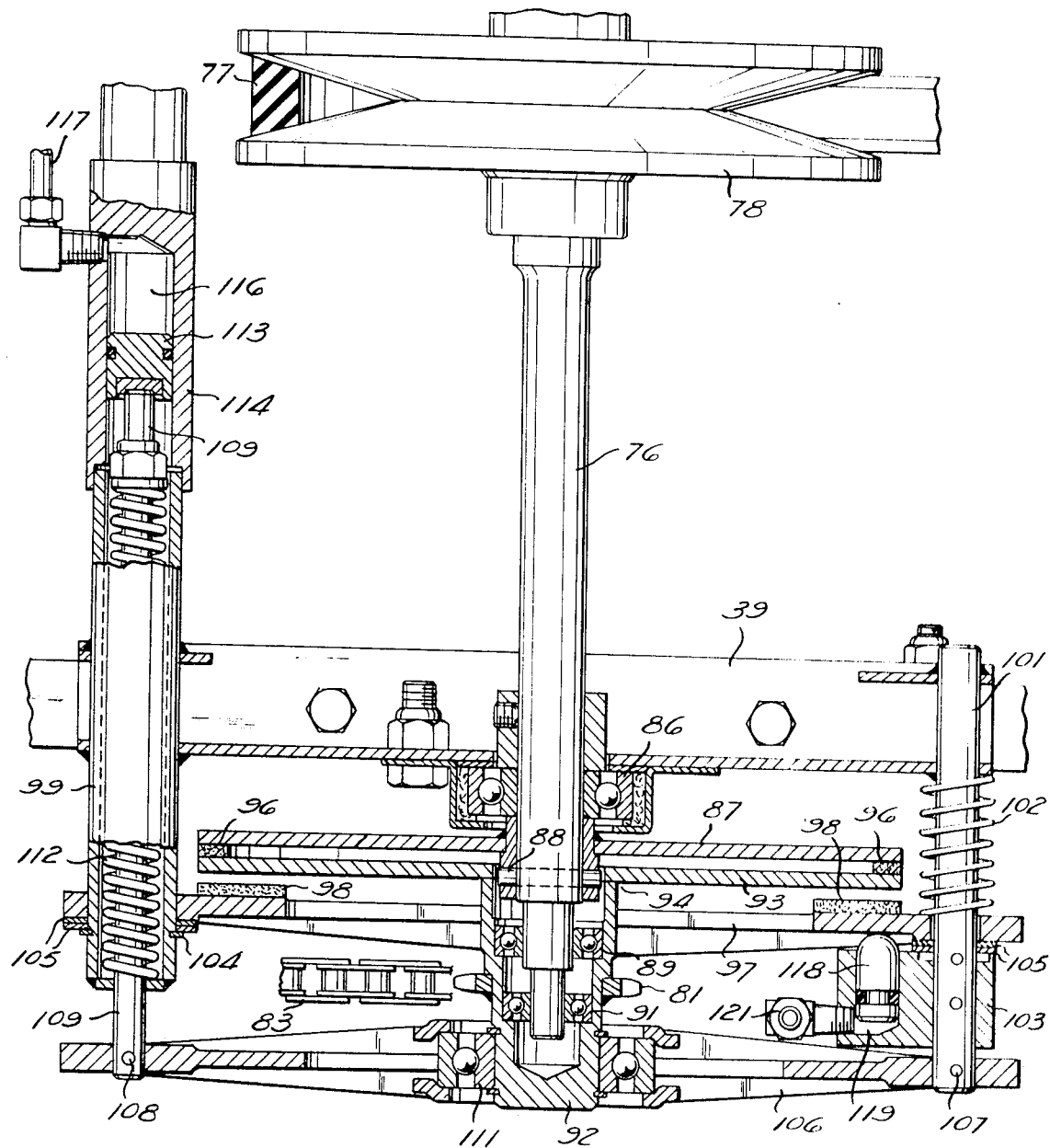
FIG. 7 is an enlarged fragmentary view partially in section illustrating the structure of the clutch and brake mechanisms used for driving, steering and braking the vehicle.

Reference should now be made to FIGS. 3, 4, and 7 which illustrate the structure of the power assembly 36. The engine is connected to drive a shaft 76 journaled on the frame 39 through a flexible drive belt 77 of the V-belt-type. A variable speed drive is utilized which includes a drive pulley 78 having side plates resiliently urged toward each other and a centrifugal weight actuated speed responsive drive pulley 79.

The drive pulley 79 is arranged so that the belt 77 is loose when the engine is idling so that the drive is automatically disconnected at that time. As the engine is accelerated, the two sides of the drive pulley 79 automatically move toward each other under the influence of a centrifugal speed responsive mechanism. When this occurs the belt 77 is tightly engaged and rotation of the shaft 76 is initiated. The drive is arranged so that a speed reduction occurs when the drive is initiated and as the engine speed increases to a predetermined speed, the two sides of the drive pulley 79 are pressed further together causing the belt 77 to be pulled down between the sides of the output pulley 78 to decrease the speed reduction. With this type of drive, which is well known to persons skilled in the art, an automatic shifting function is achieved so that slowing of the vehicle has the effect of increasing the speed reduction so that higher torques are available when the vehicle encounters increases in the resistence to movement. However, as the vehicle speed picks up, the drive will automatically shift to provide the proper speed reduction for higher speed operation.

THE CLUTCH AND BRAKE MECHANISM

Mounted on opposite ends of the shaft 76 are separate but similar clutch and brake mechanisms which include drive sprockets 80 and 81, respectively. The drive sprocket 80 is connected to rotate the output sprocket 37 through a chain 82 and the drive sprocket 81 is connected to drive the output sprocket 38 through a chain 83.

Reference should be made to FIG. 7 which illustrates the structural detail of one of the two similar clutch and brake assemblies. The shaft 76 is journaled in a bearing 86 mounted on the frame 39. A drive disc or plate 87 is mounted on the end of the shaft 76 immediately outward of the bearing 86 and is connected for rotation with the shaft by a cross pin 88. Journaled on the shaft 76 outward of the drive member 87 on spaced bearings 89 and 91, is a tubular member 92. The tubular member supports the drive sprocket 81 which drives the chain 83 and a driven plate 93 welded at 94 to the inner end of the tubular member 92. Friction drive material 96 is provided on the drive member 87 adjacent its periphery.

Positioned outward of the driven plate 93 is a brake spider 97 which is provided with friction brake material 98 adapted to engage the opposite side of the driven plate 93. The brake spider 97 extends over a support tube 99 forward of the shaft 76 and a support pin 101 rearwardly of the shaft 76. The support tube 99 and pin 101 are mounted on the frame 39 so the brake spider 97 is fixed against rotation although it is axially removable relative to the shaft. A spring 102 normally maintains the adjacent end of the brake spider 97 against a brake cylinder housing 103 carried by the pin 101 and holds the brake spider in its normally released position illustrated in FIG. 7. A snapring 104 on the support tube 99 positions the other end of the brake spider. Adjustment of the spider position is obtained by installing or removing spacers 105.

The two bearings 89 and 91 which support the member 92 are axially slidable along the shaft 76 so that the tubular member 92 can be moved axially with respect to the shaft 76. The axial movement of the tubular member 92 is provided by an actuator arm 106. The arm 106 is pivoted at 107 on the pin 101 at one end and is pivotally connected at 108 to an actuator rod 109 at its other end. A bearing 111 mounted in the actuator arm 106 with a self-aligning installation connects the central portion of the actuator arm to the tubular member 92.

A compression spring 112 normally urges the actuating rod 109 in an inward direction as illustrated in FIG. 7 and normally maintains the driven plate 93 in tight engagement with the friction material 96 carried by the drive plate 87. Therefore, the clutch is normally engaged by the spring 112 and the drive sprocket 81 is normally rotated with the shaft 76 at its rotation velocity. However, when the actuating rod 109 moves against the spring 112 the tubular member 92 and the driven disc 93 is carried axially outward causing the driven disc to move out of engagement with the drive friction material 96. This causes a disengagement of the drive clutch. Continued movement of the driven disc or plate 93 carries it into engagement with the braking friction material 98 on the brake spider 97 so that the driven plate is held against rotation with a force which is a function of the pressure of engagement thereof with the brake spider 97. It is this operation of axial movement of the driven plate 93 which is utilized for normal steering. The movement of the actuating rod 109 is controlled by a piston 113 which bears against the inner end of the actuating rod 109. The piston 113 is movable along a cylinder 114 in response to hydraulic pressure in a cylinder chamber 116. The manner in which hydraulic fluid under pressure is delivered to the chamber 116 through a pressure line 117 from a steering actuating cylinder controlled by the steering wheel 19 is described in detail below.

The brake spider 97 may also be moved toward the driven plate 93 by a piston 118 which is actuated by a foot operated brake. When fluid under pressure is admitted to the chamber 119 behind the piston 118 the brake spider 97 is moved against the action of the spring 102 into engagement with the brake side of the driven disc 93. A pressure line 121 connects the chamber 119 to the foot operated brake cylinder which will be described in detail below.

The operation of the clutch and brake assembly is substantially as follows. During normal operation the clutch and brake mechanisms at each end of the shaft 76 are maintained by their springs 112 with a drive clutch engaged so all of the wheels 12 and 13 are connected for driving rotation at the same speed. When it is desired to turn to the left, as viewed in FIG. 3, pressure is delivered through the pressure line 117 to the cylinder chamber 116 to the left assembly causing the actuating rod 109 to move against the spring 112 to declutch the clutch associated with the wheels on the left side of the vehicle. If such declutching procedures enough turning, no braking is applied. Such declutching will produce a long relatively gentle turn. However, if a sharper turn is desired, increased pressure is delivered to the chamber 116 of the left assembly and the associated driven disc 93 is moved over into engagement with the brake spider friction material. This causes the wheels on the left side of the vehicle to be held against rotation with a braking torque which is a function of the pressure delivered to the chamber 116. The amount of braking determines the radius of the turn and if the brake is applied with a sufficient force to lock the driven disc 93 against rotation, the wheels 13a, 13b, and 13c are held against rotation and the vehicle pivots substantially about the center wheel 13b.

With this structure an infinitely variable steering radius can be obtained since the radius of the turn is determined by the amount of braking applied. As soon as the turn is completed, the pressure in the chamber 116 is released and the clutch reengages for continued driving. The cylinder chambers 116 associated with each of the clutch and brake mechanisms are separately connected to the steering system so the clutching and braking of the wheels on one side of the vehicle occurs without declutching the wheels on the other side of the vehicle.

When full braking is desired to stop the vehicle or hold it against movement, a foot brake, described in detail below, is actuated to pressurize the chambers 119 on both of the clutch and brake mechanisms. When this occurs the brake spiders on each side of the vehicle are moved over against the associated driven discs 93 to hold them against rotation even though the clutches remain engaged. Normally, brakes are not applied while the engine is operated at sufficient speed to drive the vehicle. Therefore, the operation of the brake merely operates to stop the shaft 76 and hold it and all of the wheels against rotation.

This arrangement where the clutch does not disengage when the foot brake is applied is desirable since it prevents an operator from racing the engine with the brake applied and then engaging the clutch. Such operation could place an undesirable strain on the drive system if the engine were allowed to race before the clutches were engaged. With this system if the foot brake is applied while the throttle is depressed, the brakes provide sufficient braking torque to hold the shaft 76 against rotation. Therefore, as the engine is accelerated to engage the drive pulley 79, the engine is loaded and prevented from racing. In practice, the belt 77 slips under such an operating condition.

Figure 8:
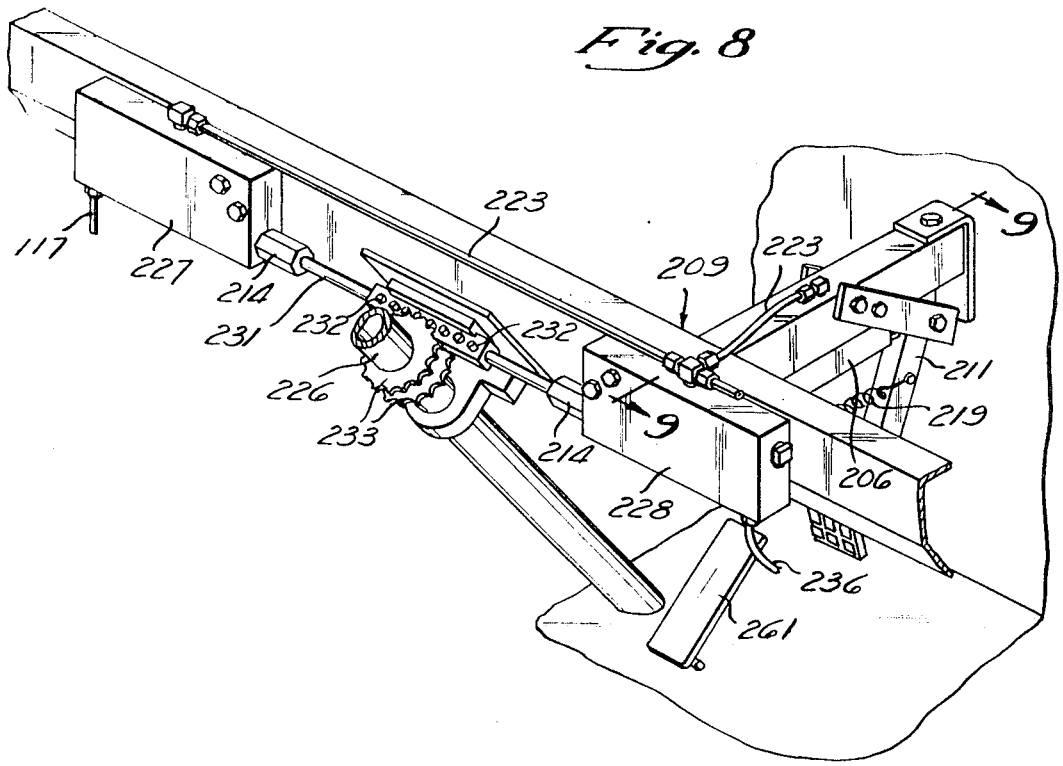
FIG. 8 is a fragmentary perspective view of the steering and brake-actuating mechanism.
Figure 9:
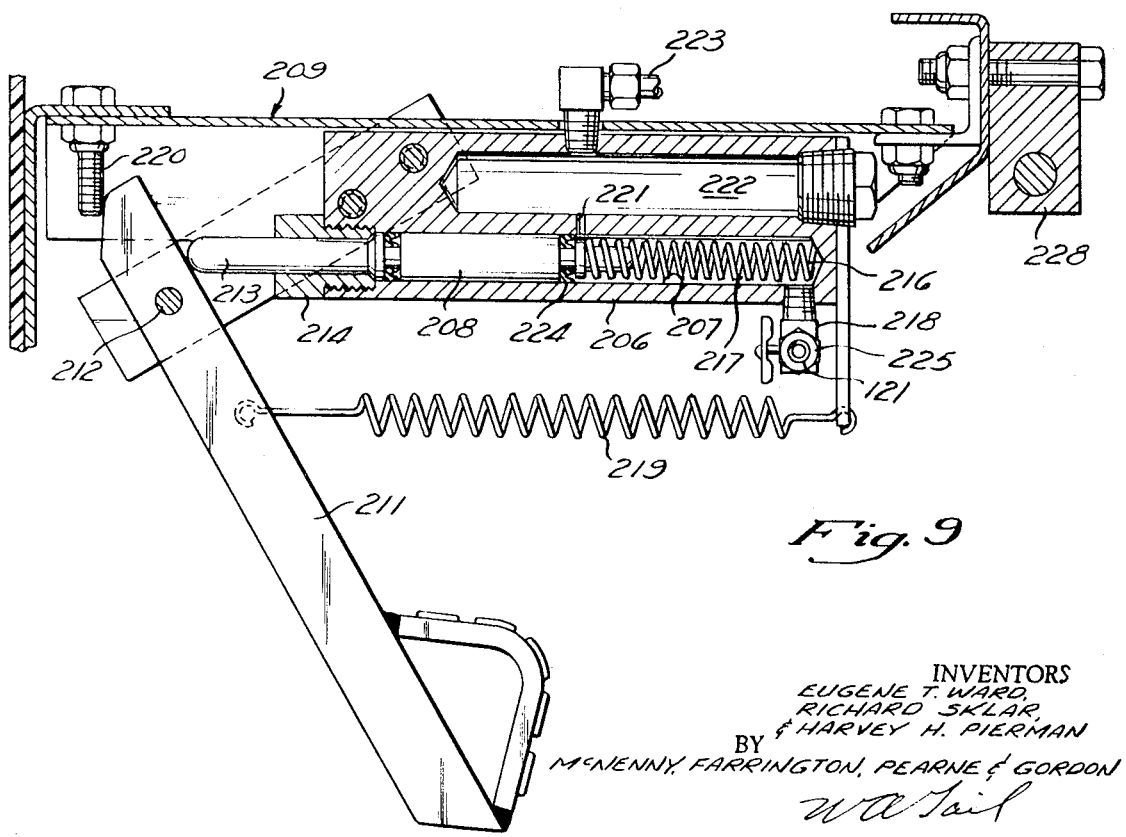
FIG. 9 is an enlarged fragmentary section taken generally along 9—9 of FIG. 8 illustrating the structure of the hydraulic brake cylinder.

Referring now to FIGS. 8 and 9 the brake-operating pressure for pressurizing both of the chambers 119 with the foot brake is developed by a master brake cylinder 206, best illustrated in FIG. 9. The cylinder 206 is provided with a cylinder bore 207 and a piston 208 axially movable therein. The cylinder body is mounted on a support frame 209 in the vehicle body. Also supported on the frame 209 is a brake pedal 211 which is pivoted at 212. A piston extension 213 extends forwardly through gland nut 214 and engages the brakes pedal 211 at a location above the pivot 212. Consequently, when the foot pedal is depressed, and moved about its pivot 212 in a clockwise direction as viewed in FIG. 9, the piston 208 is moved to the right against the action of the spring 216 to pressurize the hydraulic fluid located in the chamber 217. The pressurized fluid is delivered through a fitting 218 to the pressure line 121. The pressure line 121 connects to the chamber 119 of each of the brake and clutch assemblies so operation of the brake pedal moves each of the brake spiders 97 inwardly against the associated drive plate 98 to apply brakes to all of the wheels.

A spring 219 is provided to normally maintain the brake pedal in the release position illustrated so that the position 208 is normally maintained in the illustrated position. In this position the upper end of the pedal arm engages a bolt 220 which serves as a stop. When the piston 208 is in the illustrated position, the chamber 217 is connected through a small port 221 to a reservoir 222 formed in the cylinder body. The chamber 222 is in turn, connected to a main supply of hydraulic fluid through a supply line 223. The first movement of the piston 208 from the illustrated position causes a seal 224 carried thereby to move past the port 221 and isolate the chamber 217 from the reservoir chamber 222. Continued movement of the piston then causes brake pressurization and brake operation. Each time the brake is released the port 221 is reopened so leakage is automatically replaced. A shut off valve 225 is provided adjacent to the fitting 218. This valve 225 may be closed after the brakes are locked to maintain braking when the vehicle is parked.

The selective operation of the brakes for steering is achieved by the structure illustrated in FIG. 8. The steering wheel 19 is mounted on a steering column 226 which is supported by the frame 209 for rotation about its longitudinal axis. Mounted on the frame 209 are two separate, but similar, master cylinders 227 and 228. These master cylinders have a structure similar to the structure of the brake cylinder 206. They, however, are mounted opposite each other so that a single-piston actuator 231 may be used to selectively operate the piston of one cylinder or the other.

The actuator rod 231 is proportioned to extend into the gland nut 214 of the cylinder 227 and engage the end of the piston of that cylinder at one end. Similarly, it extends at its other end into the gland nut 214 of the cylinder 228 and engages the piston of that cylinder at its end. Intermediate its ends the actuator rod 231 is provided with a plurality of laterally extending pins 232 which are engaged by a pair of drive sprockets 233 carried by the steering column 226. The sprockets 233 and pins 232 function as a rack and pinion drive so that counterclockwise movement of the steering column causes movement of the actuating rod 231 toward the cylinder 227. This causes pressurized fluid to be delivered to the pressure line 117 connected to the chamber 116 of the brake and clutch assembly on the left side of the vehicle. This movement, however, does not cause any of the movement of the piston in the cylinder 228 since it bottoms on the gland nut 214.

When the steering wheel is turned to the left therefor, the hydraulic pressure delivered to the left clutch and brake assembly causes the clutch on the left side of the vehicle to be first declutched and if additional pressure is delivered, the left brake is applied with a braking torque which is a function of the delivered pressure from the cylinder 227. Therefore, the radius of the turn to the left is controlled by the force applied to the turning of the steering wheel.

When steering to the right is required, the steering wheel is rotated in a clockwise direction causing the actuator rod 231 to move to the right. This causes pressurized hydraulic fluid to be delivered from the cylinder 228 to the pressure line 236 connected to the chamber 116 of the brake and clutch assembly on the right side of the vehicle. Here again, this produces declutch of the drive clutch on the right side of the vehicle, and if sufficient pressure is developed by the turning of the wheel the brake on the right side of the vehicle is applied with a braking torque proportional to the torque applied to the steering wheel.

With this arrangement, any desired turning radius can be obtained in either direction with the steering wheel. Here again, supply line 223 is connected to the cylinders 227 and 228 to provide makeup fluid to replace any leakage.

CHAIN TENSIONING AND POWER UNIT MOUNTING

Referring to FIG. 4 the shaft 41 is movable relative to the frame 39 to adjust the tension of the chains 82 and 83. The chains tensioning structure includes sideplates 131 welded to the shaft 41. Draw bolts 132 extend through upstanding plates on the forward end of the frame 39 and are provided with nuts on the rearward side of a vertical plate 133 welded to the shaft 41 and sideplates 131. Forward and rearward movement of the sideplates 131 is accomplished by appropriate adjustment of the draw bolts 132 to adjust the tension in the chains 82 and 83. When the sideplates are properly positioned for proper tensioning, the sideplates are locked in position by bolts 134 which extend through slots in the plate 131 and anchor in the frame 39.

The frame 39 with the engine and transmission system mounted thereon is supported in the vehicle in a manner which minimizes noise and vibration transmission to the vehicle body and also provides easy adjustment of the tension of the chains 42 and 52 on one side and the chains 43 and 53 on the other side. The frame 39 is generally U-shaped and is supported toward its rearward end by bolts 136 which extend through slots 137 in the upstanding flanges 138 formed at opposite ends of a support member 139. The support member is bolted to the floor 72 of the vehicle and provides a substantial area in contact with the floor 72 so that stress concentrations do not occur.

The forward end of the frame 39 is supported by a pair of similar adjustable bracket assemblies 141 illustrated in FIGS. 4 and 5. These bracket assemblies include a mounting plate member 142 bolted to the adjacent side 143 of the vehicle body 23. Here again, substantial area is provided for contact with the fiber glass body to avoid stress concentrations. The plate 142 is provided with a horizontal flange 144 through which drawbolts 146 extend. An L-shaped adjusting plate 147 is vertically adjustable along the plate 142 and is provided with a lateral flange through which the drawbolts 146 extend. A pivot bolt 149 extends through the adjusting plate 147, a support link 152 and through a slot 148 in the mounting plate 142. Vertical adjustment of the adjusting plate 147 and support link 153 is accomplished by loosening the nut on the pivot bolt 149 and vertically adjusting the plate 147 by means of the nut on the drawbolts 146. When properly adjusted the nut on the pivot bolt 49 is tightened. The ends of the shaft 41 extend through the associated support link 152 so vertical adjustment of the adjustable plate 147 operates to adjust the vertical position of the forward end of the frame 39.

The pivotal connection of the links 152 accommodates a limited amount of forward and rearward movement of the frame 39. Since the rearward end of the frame is supported by bolts located in slots 137 the frame is mounted for limited forward and rearward movement. With this structure the longitudinal position of the frame 39 and the power assembly mounted thereon is determined by the chains 42 and 52 on one side and by the chains 43 and 53 on the other side. The tensioning of the chains is adjusted by vertical adjustment of the forward end of the frame 39. For example, if either of the chains 53 or 43 are loose, upward adjustment of the associated link 152 raises the forward end of the adjacent side of the frame to tighten these chains. The frame 39 is free to move forward and backward so that the tension in the two chains 43 and 53 is equalized. A similar adjustment of the opposite side properly tensions the chains 42 and 52 and insures that they are equally tensioned. Therefore, the longitudinal position of the frame 39 and the power unit is determined by these chains. After the chains are properly tensioned, the bolts 136 can be tightened to lock the frame in the adjust position. This adjusting structure combines the functions of supporting the power unit and tensioning four chains.

Referring to FIGS. 3 and 6, the adjustment of the tension in the chains 61 and 62 is provided by an adjustment member 161 which is bolted to the sidewall 143 of the body member 23 by bolt fasteners 162. The adjustment member 161 is provided with a lateral flange 163 which supports a wear member 164 positioned to engage the upper reach 166 of the associated chain 61 or 62. The adjustment member is provided with a plurality of holes 167 sized to receive the bolt 162. Vertical adjustment of the adjustment member and, in turn, tension in the associated chain is accomplished by removing the nut from the bolt 162 and moving the adjustment member up or down by the proper selection of one of the holes 167. The wear pad 164 is preferably formed of a tough plastic material such as nylon or the like and is positioned for engagement with the upper reach of the associated chain since such reach is not placed in tension by forward movement of the vehicle. Therefore, the tensioning mechanism is not subjected to severe wear conditions.

WHEEL MOUNTING AND OVERLOAD CLUTCH

Each of the axles for the wheels 12 and 13 is provided with an overload clutch to limit the torque transmitted between the wheel and the drive system. These overload or slip clutches operate to prevent excessive and damaging strains from being applied to the suspension system and the power transmission system. In normal operation, the clutches do not slip and a direct drive is provided. However, when, for example, the wheels and drive systems are operating at speeds considerably greater than the vehicle speed and a wheel engages a solid surface so that it is held against rotation at the speed of the drive system, the associated clutch slips momentarily. Such situations can occur when the vehicle becomes airborne momentarily and the power trains accelerates the wheels to a speed greater than the vehicle speed. Similar situations can occur when one or more of the wheels first touches the bottom after the vehicle has been operated in water.

Preferably, each of the clutches is arranged so that it transmits a force somewhat greater than half of the maximum torque of the drive system so that all of the available torque of the drive system can be delivered through two wheels. This is particularly desirable when the vehicle first encounters the shore after being waterborne and it is necessary to drive the vehicle up a bank or the like. In such an instance, the forward two wheels may be the only wheels in engagement with the bottom and the entire drive torque available can be transmitted through such two wheels until other wheels engage solid surface.

The mounting of the axle for each of the wheels is similar and the structure of the slip clutch provided on each of the axles is similar excepting for the fact that two sprockets are provided on the slip clutches associated with the center axles 57 and 58.

Reference should now be made to FIG. 10 which illustrates the structure for mounting of the axle 58 and the structure of the associated slip clutch. It should be understood that similar structures are provided for the other axles.

The inner end of the end of the axle 58 is journaled in a bearing 171 supported by a retainer 172 mounted on the upstanding flange 173 of a U-shaped support bracket 174. The support bracket 174 rests on the load plate 176 which is positioned against the floor 72 of the vehicle body. Bolt fasteners 177 secure the bracket 174 and plate 176 in position. The plate 176 is preferably relatively large so that it distributes the load over a substantial area of the vehicle floor 72. A cushioning liner 178 preferably formed of elastomeric material such as rubber is positioned around the outer race of the bearing 171 to provide self-aligning characteristics and some dampening of vibration to reduce noise transmission. The inner race of the bearing 171 is positioned between a snap ring 179 and a shoulder 181 so that the bearing is capable of absorbing axial forces on the axle 58 in both directions.

A second bearing 182 is provided at the location where the axle emerges from the vehicle body. This bearing is secured in the vertical sidewall 143 of the vehicle body member 23 by an inner clamping plate 183 and an outer clamping plate 184. The two clamping plates 183 and 184 are bolted by a plurality of fasteners 186 to the sidewall 143 and are sized to distribute the load over a substantial area of the sidewall 143. The inner race of the bearing 182 is sized to fit the adjacent portion of the axle 58 and is positioned against a spacer 190. The retainer 184 is formed with an extension in which is mounted a seal ring 187. This ring prevents leakage of water in along the axle. Preferably a grease fitting 188 is provided to permit the greasing of the bearing and seal 187.

With this structure loads transmitted to the vehicle body at locations, and in directions, of greatest body strength. For example, axial forces on the axles are transmitted primarily through the bearing 171 since such forces are parallel to the plane of the vehicle bottom and that portion provides maximum stiffness and strength in such plane. Similarly, vertical forces are transmitted primarily through the bearing 182 in the plane of the wall portion 143, the plane of its maximum strength and stiffness. Normally, the maximum downward load is a load determined by the weight of the wheel when the vehicle is operated so that the wheel is out of contact with the ground. The maximum vertically upward load is the load applied through the tire from the ground. Because the tires are very low-pressure tires, they provide sufficient cushioning action to prevent damaging loads from being applied to the sidewall 143.

At the bearing 171 the only significant vertical load is in a downward direction. Since the plate 176 is relatively large in area and provides a substantial distribution of the load along the vehicle floor 72, such loads cannot produce damage. The bearing 171 also is subjected to axial loads as mentioned above. These loads, however, are in the plane of the vehicle floor 72 so they do not produce damage. With this structure for transmitting the supporting loads between the axle and the vehicle body, it is not necessary to utilize a rigid-frame system and damaging stresses are not applied to the body even though it is formed entirely of plastic material.

This structure for mounting the axles also permits the body to be arranged so that the spacing between the center bottom of the lower body member 23 is spaced from the adjacent portion of the floor member 32 by a distance not substantially greater than the diameter of the bearing 171. Therefore, the vehicle provides for low positioning of the passengers and a low center of gravity.

The slip or overload clutch includes a clutch plate 191 welded to the axle 58 for rotation therewith. The clutch drive assembly includes two sprockets 56 and 194. The sprocket 56 is driven by the chain 53 and the sprocket 194 drives the chain 62. Mounted on the sprocket 194 is clutch friction material 192. The two sprockets are held in spaced relationship by spacers 196 which also connect them for corotation. The sprockets 56 and 194 extend around the axle 58 but are free to rotate with respect thereto. The clutch spring 197 produces an axial force against a thrust member 198 which is transmitted to the sprockets and causes the clutch plate 191 to tightly engage the friction material 192. The opposite end of the spring 197 engages a thrust washer 199 which seats against a cup retainer 201 fixed against a snapring 202. The cup retainer 201 prevents the snapring from slipping out of its mating groove in the axle 58. The various elements are proportioned so that the spring 197 produces sufficient force on the sprockets urging the friction material 192 against the clutch plate 191 with the force necessary to permit a transmission of torque from the sprocket 194 to the axle which is at least equal to about one half of the maximum drive torque delivered by the drive system. Consequently, in normal operation, the axle 58 is driven at the same speed as the sprocket 194. However, the clutch automatically slips whenever excessive torque is encountered.

It has been found in actual practice that this slip clutch mechanism virtually eliminates axle and chain breakage one-half it limits the strain transmitted therebetween. Because the clutches limit the strain supplied to the drive system, the drive system itself need not be overly heavy to function in a reliable manner without damage. The clutch structure for the forward axles and rearward axles are similar excepting a single sprocket is utilized instead of a double sprocket structure. All of the clutches, however, are arranged to slip at approximately the same torque valve.

THROTTLE CONTROL LINKAGE

It is customary to provide a governor for a small air-cooled internal combustion engine of the type employed in the illustrated embodiment of this invention. Such governors protect the engine against overspeeding. Generally, such governors include a governor lever or the like which is connected to the throttle and is biased toward the full throttle position by a manually adjustable governor spring force. The governor lever is also connected to an engine speed-responsive mechanism which applied a torque that is a function of speed tending to move the throttle to a closed position. Such speed-responsive mechanism often includes rotating weights driven at a speed which is a function of engine speed and arranged so that the centrifugal force of the weights applies the torque to the lever.

In such systems the mechanism is normally arranged to permit the operator to change the governor spring force and thereby regulate the governing speed of the governor. In effect, such systems place the throttle spring in series with the manually operated throttle response is not required and manual changes in throttle conditions do not occur regularly. In the present vehicle, however, such systems are not satisfactory because the operator changes throttle positions often and rapid throttle response is desirable.

Figure 11:
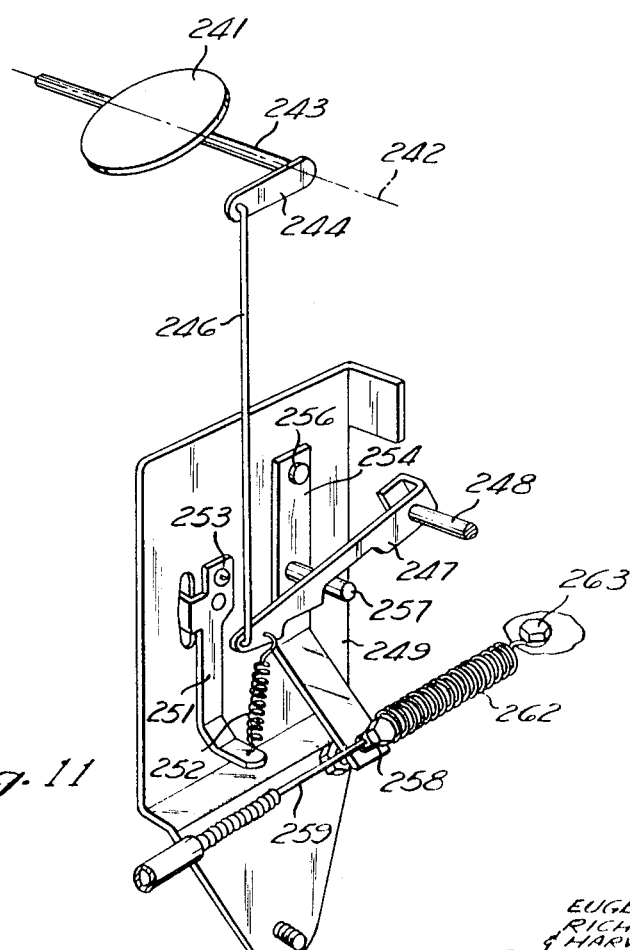
FIG. 11 is a schematic view illustrating the throttle and governor arrangement.

FIG. 11 illustrates an improved throttle control system incorporating this invention. In this figure the throttle plate is illustrated schematically at 241. The throttle plate is mounted for rotation around the longitudinal axis 242 of a support shaft 243 journaled in the carburetor. In the drawing the carburetor is not illustrated, but it should be understood that the throttle plate 241 is illustrated in a substantially full throttle position and that it rotates in a clockwise direction about the axis 242 to a throttle closed position.

An arm 244 is mounted on the shaft 243 and is connected by an operating rod 246 to the end of a governor lever 247. The governor lever 247 is mounted on the end of the governor shaft 248 which is connected to the speed-responsive mechanism of the engine. The mechanism is arranged to produce a biasing torque tending to rotate the governor arm 247 in a clockwise direction with a value which is a function of engine speed. Therefore, as the engine speed increases the governor force tends to rotate the arm 247 in a clockwise direction to close the throttle.

A support bracket 249 is mounted on the engine and provides a support for a lever 251. In normal installations of the type employed in the prior art, the lever 251 is pivoted on the bracket 249 and is connected to the manually adjustable throttle so that its position is changed when manual throttle changes are made.

Connected between the lever 251 and the governor lever 247 is a governor spring 252. This spring provides a resilient force urging the governor lever 247 in a counterclockwise direction which is the direction tending to move the throttle plate toward the full throttle position. In the illustrated embodiment the lever 251 is held in a fixed position by a screw 253 so that the spring force of the spring 252 is not changed during normal operation. In this embodiment a lever 254 is pivoted at 256 on the bracket 249 and is provided with a projection 257 which engages the underside of the governor lever 247. The lever 254 is connected at 258 to the end of a throttle wire 259 which, in turn, is connected to a foot throttle 261 illustrated in FIG. 8. A spring 262 anchored in the vehicle at 263 is connected to the lever 254 to bias the lever in an anticlockwise direction. The various elements are proportioned so that the spring 262 normally maintains the throttle pedal 262 and the throttle 259 in a throttle closed position. In such position, the projection 257 is moved anticlockwise from the illustrated position and causes the governor lever 247 to close the throttle.

When the operator depresses the pedal 261 the lever 254 is moved against the action of the spring 262 to the illustrated position in which the governor lever 247 is permitted to move under the action of the spring 262 to the throttle open position. As the engine speeds up to the predetermined maximum speed, for example, 4,000 r.p.m., the governor overcomes the action of the spring 252 and moves the governor lever out of contact with the projection 257 and closes the throttle an amount sufficient to maintain the governed speed. In practice the spring 252 is sized and tensioned for maximum governed speed and the lever 247 remains in contact with the projection 257 so the throttle is controlled in normal operation by the movement of the lever 254. Therefore, when the operator depresses the foot pedal 261 and the throttle immediately moves to the full throttle position or the position determined by the pedal. The only time the governor functions to control speed is when the maximum governing speed is reached. When the occurs, the governor torque exceeds the force of the spring 252 and the lever 247 moves away from the projection 257. With this structural arrangement, the relatively high spring force is provided by the spring 252 at all times and throttle hunting is eliminated. Also rapid throttle response is achieved without eliminating the protection of the governor to prevent overspeeding of the engine.

A vehicle incorporating the present invention permits the use of a relatively low cost, light weight, molded plastic body while still providing durability and reliability. The belly pan protects the underside of the vehicle against impact and abrasion. The suspension system is arranged so that excessive forces or strains are not transmitted to the body so the body is not damaged even when the vehicle is operated in a rough manner. Further, a clutch is provided at each of the wheels which automatically limits the maximum torque transmitted between the drive system and the wheels and protects the axles and drive system from excessive strain and damage. The cooling air for the engine is drawn by the engine-cooling fan out of the engine compartment and is exhausted through the duct 17 so there is a continuous ventilation of the engine compartment whenever the engine is operated. Therefore, the engine compartment does not get overly hot and explosive fumes do not collect. The use of parallel drive systems along opposite sides of the vehicle permits the passenger compartment floor 32 to be close to the bottom of the vehicle since it need be spaced from the body floor only the distance required for the center mounting of the axles. With this structure the passengers may be located low in the vehicle where they are protected and the vehicle has a relatively low center of gravity. A simple clutch and brake assembly which is hydraulically operated provides for the steering functions and the full braking functions. Further, the mounting of the power assembly is such that the minimum of vibration and noise is transmitted to the vehicle body and tensioning of the primary drive chains is easily accomplished. The various aspects of this invention cooperate to provide a vehicle which is durable in use, easy to operate, relatively light weight and relatively low in cost.

Although a preferred embodiment of this invention is illustrated, it is to be understood that various modifications and rearrangements may be resorted to without departing from the scope of the invention disclosed.

What is claimed is:

1. An all-terrain vehicle comprising a body, a plurality of nonsteerable wheels mounted in each of a pair of groups thereof that are respectively journaled on each side of said body, rotary power drive means mounted in said body providing two drive output assemblies with each of the latter including alternately operable clutch and brake means and a rotary output element, a pair of separate driving trains each individually connecting one of said output elements to one of said groups of drive wheels, and a rotary hand-steering control unit commonly connected to both of said output assemblies for alternate operation thereof, wherein the improvement comprises in each of said output assemblies a rotary drive plate which is nonaxially translatable, a nonrotary and axially translatable brake plate spaced axially from the latter and a rotary and axially translatable driven plate located between said drive and brake plates for alternate engagement thereof, first spring means biasing said brake plate axially out away from said driven plate to an axially fixed position, said driven plate to an axially fixed position, said driven plate being rotationally fixed to the associated output element for drive of the latter, second spring means normally biasing said driven plate to driving engagement of said drive plate, said driven plate being axially movable by rotation of said hand-steering control unit against the biasing of said second spring means out of driving engagement with said drive plate and to braking engagement with said brake plate, and foot-control-operated means to force said brake plate axially inward against the biasing of said first spring means to braking engagement with said driven plate while the latter is in driving engagement with said clutch drive plate.

2. The all-terrain vehicle as set forth in claim 1, wherein the rotation of said hand-steering control unit and the actuation of said foot-control-operated means that effect selective operation of said clutch and brake assemblies is accomplished by fluid-pressurizing systems having therein a pair of master clutch pressurized fluid supply controls that are alternately manipulated by rotation of said hand-steering control unit in opposite directions, a pair of fluid pressure-responsive slave motors individually flow connected to said master clutch controls and located respectively in said clutch and brake assemblies with each of said slave motors mechanically connected to the biased rotary driven plate are located for axial retraction of the latter from engagement with the associated rotary drive plate therein to engagement of the nonrotary brake plate therein, a single master brake pressurized fluid supply control mechanically operated by a foot control unit, and a pair of fluid-pressure responsive, brake slave motors commonly flow connected to said single master brake control and located respectively in said clutch and brake assemblies with each mechanically connected to said biased, axially translatable and nonrotary brake plate in the same assembly to force this brake plate axially to engagement of the associated driven plate while the latter is in driving engagement of the associated clutch drive plate, the pair of separate brake plates being simultaneously axially translated by said pair of brake slave motors upon manipulation of said foot control unit for effecting braking action in the pair of clutch and brake assemblies without declutching the latter.

3. The all-terrain vehicle as set forth in claim 2 wherein said pair of master clutch supply controls are in the form of fluid pressure-creating clutch master cylinders which are mounted in substantial opposed relation to each other with each having a thrust piston equipped with a thrust stem, a relatively stiff, reciprocative thrust member supported between these thrust stems in opposed relation thereto for applying forward thrust alternately to said piston stems, means limiting retractive following of each of said stems relative to the intervening reciprocative thrust member when the latter is thrusting the other stem forward, and mechanism for translating rotary action to reciprocal action mechanically connecting said rotary hand-steering control unit to said reciprocative thrust member whereby rotation of said steering control unit in one direction thrusts one of said stems forward without continuous retraction of said other stem and vice versa.

4. The all-terrain vehicle as set forth in claim 1 in which said body comprises an assembly including a molded lower body member formed of fiber-reinforced plastic with each drive wheel being provided with an axle assembly journaled in bearings directly supported on said fiber-reinforced plastic.

5. An all-terrain vehicle as set forth in claim 4 wherein said body assembly includes a belly pan mating with and secured to the underside of said lower body, said belly pan being formed of a tough, abrasion resistent material.

6. An all-terrain vehicle as set forth in claim 5 wherein said belly pan is molded from polyethylene or the like.

7. An all-terrain vehicle as set forth in claim 4 wherein said lower body includes a horizontally extending bottom portion, and vertically extending side portions, each axle being journaled on a first bearing mounted in the associated wall portion, and a second bearing spaced from said first bearing supported by said bottom potion, said first bearing being mounted so that substantially no forces along the axis of said axle are transmitted to said wall portion, and said second bearing being mounted so that it is operable to transmit axial forces along the axis of said axle to said bottom portion.

8. An all-terrain vehicle as set forth in claim 7 wherein the body assembly includes a separate plastic floor member providing a floor for a passenger compartment, said floor member providing a floor portion spaced above said bottom portion by a distance substantially equal to the diameter of said second bearing.

9. An all-terrain vehicle as set forth in claim 8 wherein each of said separate driving trains includes a belt and belt-driving means subassembly which extends along the side of said body assembly to which the group of said drive wheels on this side are journaled with said belt and belt-driving means on this side providing a driving connection between said drive unit and the adjacent wheels, and said floor member and lower body member are shaped structurally relative to each other to define a closed tunnel along each side of said body assembly which encloses an appreciable part of each belt and belt-driving means subassembly.

10. An all-terrain vehicle as set forth in claim 9 wherein said floor member is removable to provide access to both of said belt and belt-driving means subassemblies.

11. An all-terrain vehicle as set forth in claim 7 wherein said body assembly also includes a rearward deck and a molded seat member which cooperates with said lower body member to define an engine compartment enclosing said drive unit, seat member being removable to provide access to said drive unit.

12. An all-terrain vehicle vehicle as set forth in claim 11 wherein said drive unit includes an air-cooled internal combustion engine, and said engine includes an engine driven fan and duct means, said fan being operable to pump engine-cooling air from said engine compartment, over said engine and then out of said vehicle through said duct means.

13. An all-terrain vehicle as set forth in claim 12 wherein a grille is provided in said rearward deck and said duct means exhausts through said grille.

14. An all-terrain vehicle as set forth in claim 13 wherein a grille is provided in said seat member open to said engine compartment through which air can move into said engine compartment.

* * * * *